United States Patent [19]
Konno

[11] Patent Number: 5,758,203
[45] Date of Patent: May 26, 1998

[54] OPTICAL DEVICE WITH BLURRING MOTION COMPENSATION MECHANISM

[75] Inventor: Norikatsu Konno, Tokyo, Japan

[73] Assignee: Nikon Corporation, Tokyo, Japan

[21] Appl. No.: 804,459

[22] Filed: Feb. 24, 1997

[30] Foreign Application Priority Data

Feb. 23, 1996 [JP] Japan .................. 8-036156

[51] Int. Cl.$^6$ .................................................. G03B 5/00
[52] U.S. Cl. .................................................. 396/55
[58] Field of Search ............................ 396/55; 348/208; 359/554

[56] References Cited

U.S. PATENT DOCUMENTS 5,181,056  1/1993  Noguchi et al. .................. 354/70

FOREIGN PATENT DOCUMENTS 3-248132  2/1990  Japan .

Primary Examiner—W. B. Perkey

[57] ABSTRACT

An optical device has an image blurring motion compensation mechanism with a locking device. When centering of a blurring motion compensation optical system is not performed, it is possible to lock the optical system but, at the same time, worsen the blurring motion compensation effect. The optical device with a blurring motion compensation mechanism is able to prevent such image blur worsening by constructing the blurring motion compensation mechanism from a blurring motion detector to detect blurring motion, a blurring motion compensation optical system to compensate for blurring motion detected by the detector by moving the optical axis of the optical system, a blurring motion compensation system drive device to drive the blurring motion compensation optical system, and a blurring motion control device to control the blurring motion compensation optical system drive device, based on the output of the blurring motion detector. The blurring motion control device includes a locking mechanism and a centering detection device to decide whether to perform a centering operation to move the blurring motion compensation optical system to a predetermined initial position. A locking control device causes operation of the locking mechanism based on the decision result of the centering detection device.

20 Claims, 10 Drawing Sheets

OPTICAL DEVICE WITH BLURRING MOTION COMPENSATION MECHANISM

CROSS REFERENCE TO RELATED APPLICATIONS

This application is based upon and claims priority from Japanese Patent Application No. 08-036156 filed Feb. 23, 1996, the contents of which are incorporated herein by reference.

BACKGROUND OF THE INVENTION

1. Field of the Invention

The present invention relates to optical devices having mechanisms which optically compensate for blurring motion, such as still cameras, video cameras, binoculars and the like. In particular, the present invention relates to optical devices with blurring motion compensation mechanisms with improved locking devices.

2. Description of the Related Art

Image blur suppression devices have as their object, suppression of, or reduction of, blurring in an image projected onto an image plane. A motion compensation device is a type of image blur suppression device that compensates for motion incident upon an optical system that projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

FIG. 12 is an oblique diagram showing an example of an optical device with a blurring motion compensation mechanism. FIG. 13 is a diagram showing an example of a locking mechanism of an optical device.

In FIG. 12, a blurring motion compensation lens 5 is mounted in a lens frame 6. The lens frame 6 is supported on a base member 7 by wire and the like resilient support members 8, 9, 10, 11. Voice coils 12, 16 are disposed in the lens frame 6, and constitute a portion of a voice coil motor (not shown in the drawing). The blurring motion compensation lens 5 moves by being driven by the voice coil motor, and performs blurring motion compensation.

Such optical devices are normally equipped with a locking mechanism which causes the blurring motion compensation mechanism to stop. The locking mechanism, as shown in FIG. 13, includes a latch solenoid 26a having a plunger which is inserted in an aperture 26b formed in the lens frame 6 to lock the mechanism. The lens frame 6 supports the blurring motion compensation lens 5 (portion A of FIG. 12), locked by the insertion of the plunger into the aperture 26b.

However, in the aforementioned optical device with a blurring motion compensation mechanism, because the plunger of the latch solenoid 26a was inserted in the aperture 26b of the lens frame 6, centering was invariably necessary prior to fixation of the blurring motion compensation lens 5.

Because of this, in the cases in which, for whatever reason, excitation occurred, and the like, control became impossible, and locking could not be performed. On the contrary, there were cases in which blurring was worsened due to centering when locking was effected during exposure, etc.

SUMMARY OF THE INVENTION

An object of the present invention is to provide an optical device with a blurring motion compensation mechanism, which can lock the blurring motion compensation optical system without worsening image blurring, such as that accompanying the performance of centering.

Objects of the present invention are achieved by an optical device having a blurring motion compensation mechanism, wherein the blurring motion compensation mechanism includes a blurring motion detector to detect blurring motion, a blurring motion compensation optical system to compensate for the blurring motion detected by the detector by moving an optical axis of the optical system, a blurring motion compensation system drive device to drive the blurring motion compensation optical system, a blurring motion control device to control the blurring motion compensation optical system drive device, based on output of the blurring motion detector, a locking mechanism capable of locking the blurring motion compensation optical system in one of a plurality positions, and a locking control device to control the operation of the locking mechanism.

Other objects of the present invention are achieved by an optical device with a blurring motion compensation mechanism, comprising a locking mechanism to lock the blurring motion compensation mechanism in place, the locking mechanism including a first member and a second member, and the locking mechanism being effective over an area equal to a surface area of the second member.

Additional objects and advantages of the invention will be set forth in part in the description which follows and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Embodiments of the present invention will now be described with reference to the attached figures.

FIRST EMBODIMENT

Figure 1:
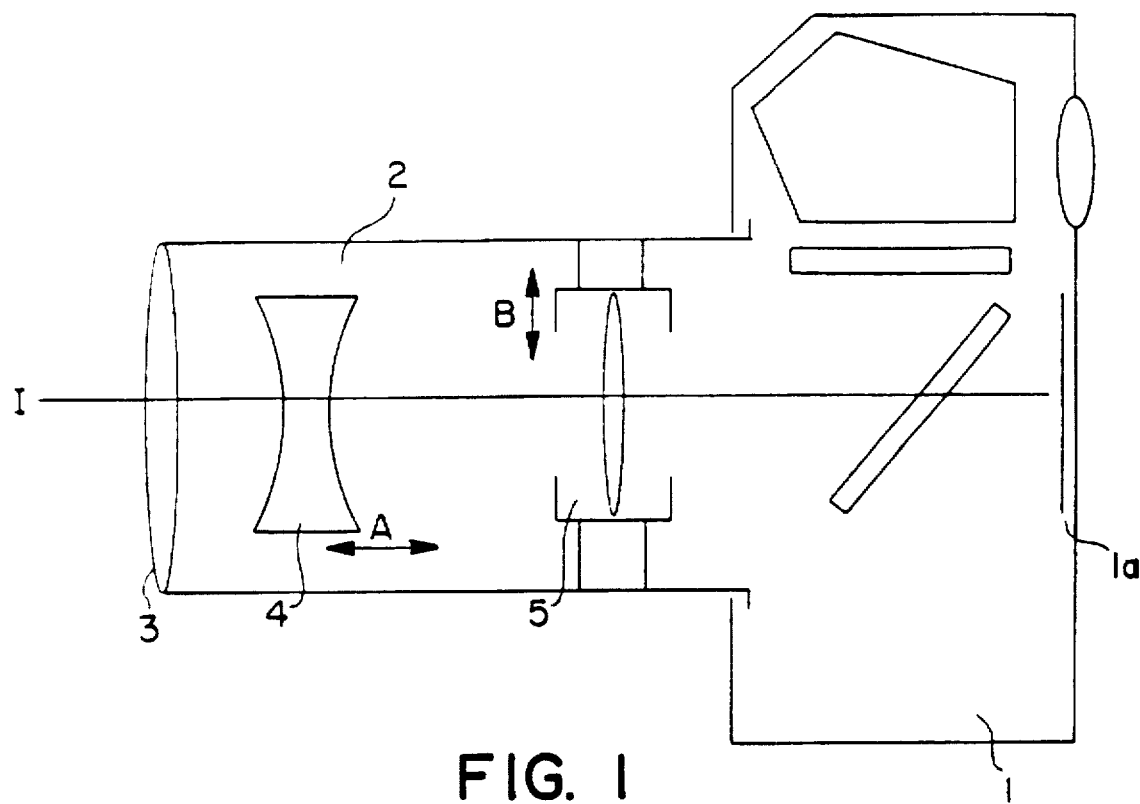
FIG. 1 is a cross sectional diagram schematically showing a first embodiment of an optical device with a blurring motion compensation mechanism according to the present invention.

FIG. 1 is a cross sectional diagram typically showing a first embodiment of an optical device with a blurring motion compensation mechanism according to the present invention.

The optical device of the first embodiment is exemplified by a single lens reflex camera with an interchangeable lens 2 detachably mounted to a camera body 1. The interchangeable lens 2 is equipped with a first lens group 3, and a second lens group 4 to adjust the focus in order to image a subject in an image plane 1a by movement in the same direction as the optical axis I (the direction of the arrow A), and a third lens group 5 ("blurring motion compensation lens") which compensates for blurring motion by driving the lens 5 in a direction at right angles to the optical axis I (the direction of arrow B) and in a direction perpendicular to the plane of the paper.

Figure 2:
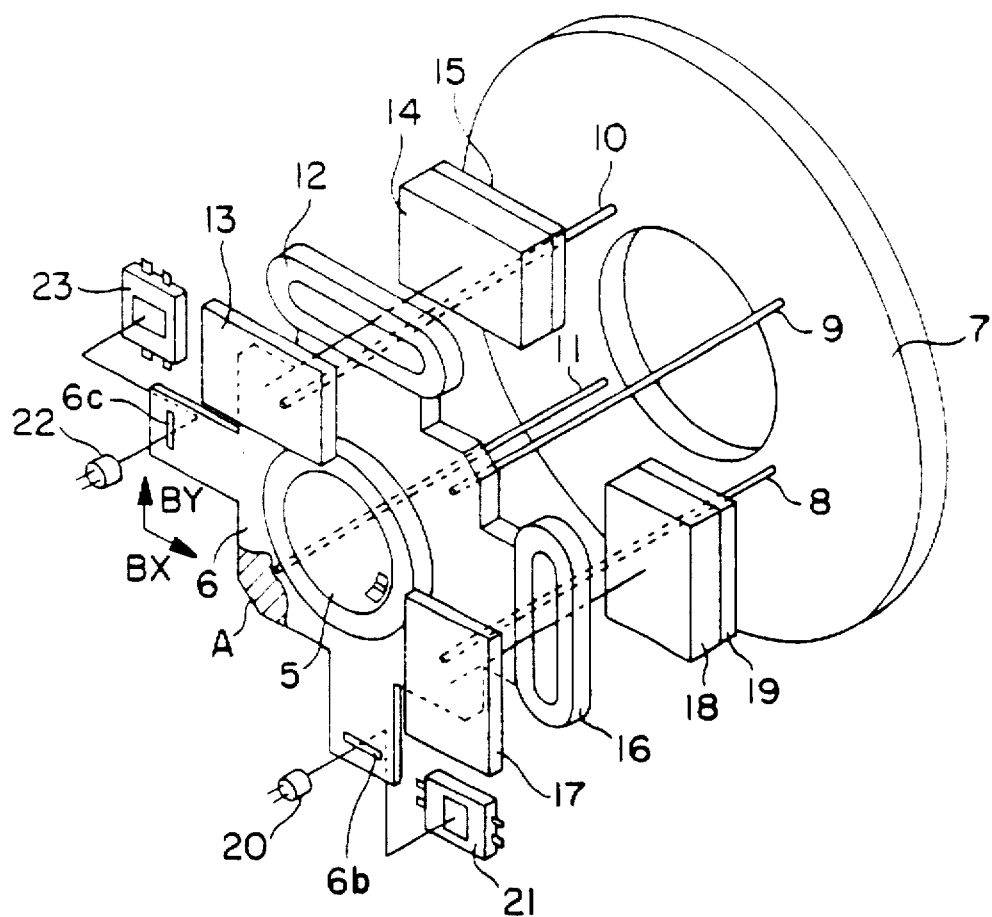
FIG. 2 is an oblique diagram showing a drive mechanism to move a blurring motion compensation lens for the optical device according to the first embodiment.

FIG. 2 is an oblique diagram showing the drive mechanism used to move the blurring motion compensation lens 5 according to the first embodiment. The blurring motion compensation lens 5 is fixed in a lens frame 6. Resilient support members 8, 9, 10, 11 are members formed of wire made of a flexible or spring material, and have respective first ends fixed to the lens frame 6, and respective second ends fixed to a base member 7. It is thus possible for the lens frame 6 to move approximately parallel with respect to the base in either the BY direction or the BX direction.

Voice coils 12, 16 are fixed to the lens frame 6. The voice coil 12 is disposed between a yoke 13, permanent magnet 14 and yoke 15. By allowing a current to flow in the voice coil 12, the voice coil 12 receives a force in the BY direction, and drives the blurring motion compensation lens 5 in this direction.

Similarly, the voice coil 16 is disposed between a yoke 17, a permanent magnet 18 and a yoke 19, and by allowing a current to flow through the voice coil 16, the voice coil 16 receives a force in the BX direction, and drives the blurring motion compensation lens 5 in this direction.

Two slits 6b, 6c are disposed in the lens frame 6. An LED 20 is disposed on the surface of one side of the slit 6b, and a PSD 21 is disposed on the opposite surface side. This structure allows position detection sensors 46a, 46b (FIG. 4) to be constituted, in order to detect the amount of movement of the blurring motion compensation lens 5.

Because light emitted from the LED 20 reaches the PSD 21 through the slit 6b, the position of the light reaching the PSD 21 moves due to the position of the blurring motion compensation lens 5 which has moved, and the output signal of the PSD 21 changes. The position of the blurring motion compensation lens 5 in the BY direction can be detected by this signal.

Moreover, an LED 22 is disposed on the surface of one side of the slit 6c, and a PSD 23 is disposed on the opposite surface side. Because light emitted from the LED 22 reaches the PSD 23 through the slit 6c, the position of the light reaching the PSD 23 moves due to the position of the blurring motion compensation lens 5 which has moved, and the output signal of the PSD 21 changes. The position of the blurring motion compensation lens 5 in the BX direction can be detected by this signal.

Figure 3:
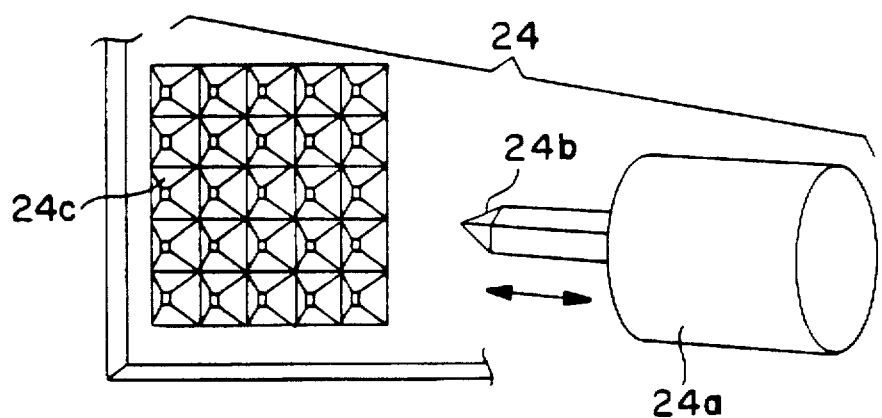
FIG. 3 is an oblique diagram showing a locking mechanism of an optical device according to the first embodiment.

FIG. 3 is an oblique diagram showing the locking mechanism of the optical device according to the first embodiment of the present invention.

Locking mechanism 24 comprises a latch solenoid 24a, and a projecting member 24b disposed at the end of the plunger of this solenoid 24a. A locking plate 24c is disposed on a portion A of the lens frame 6 of FIG. 2 and includes plural concave portions, and by inserting the projection 24b into the locking plate 24c, using the latch solenoid 24a, the blurring motion compensation lens 5 can be caused to stop at an optimal position. Because the form of the plural concave portions is a regular polygonal pyramid, inserting the projection 24b into any position along its oblique surfaces allows the locking mechanism 24 to invariably be locked.

Here, there may be a plurality of inserted projections 24b, and the surfaces of these projections may be rough. Moreover, the form of the concave portions may also be triangular pyramids or hexagonal pyramids. At this time, when there are flat bottom edges adjacent to the pyramids, so as to avoid flat surfaces which cannot lock, while not shifting the blurring motion compensation lens 5 or the latch solenoid 24a, it is desirable to minimize the flat surface area so that any polygonal pyramid may be used. In an embodiment such as this, there is the advantage, in the case of square pyramidal concave portions, compared with a triangular spindle and the like, that because the arrangement is regular, control is easy and manufacturability is also good.

Figure 4:
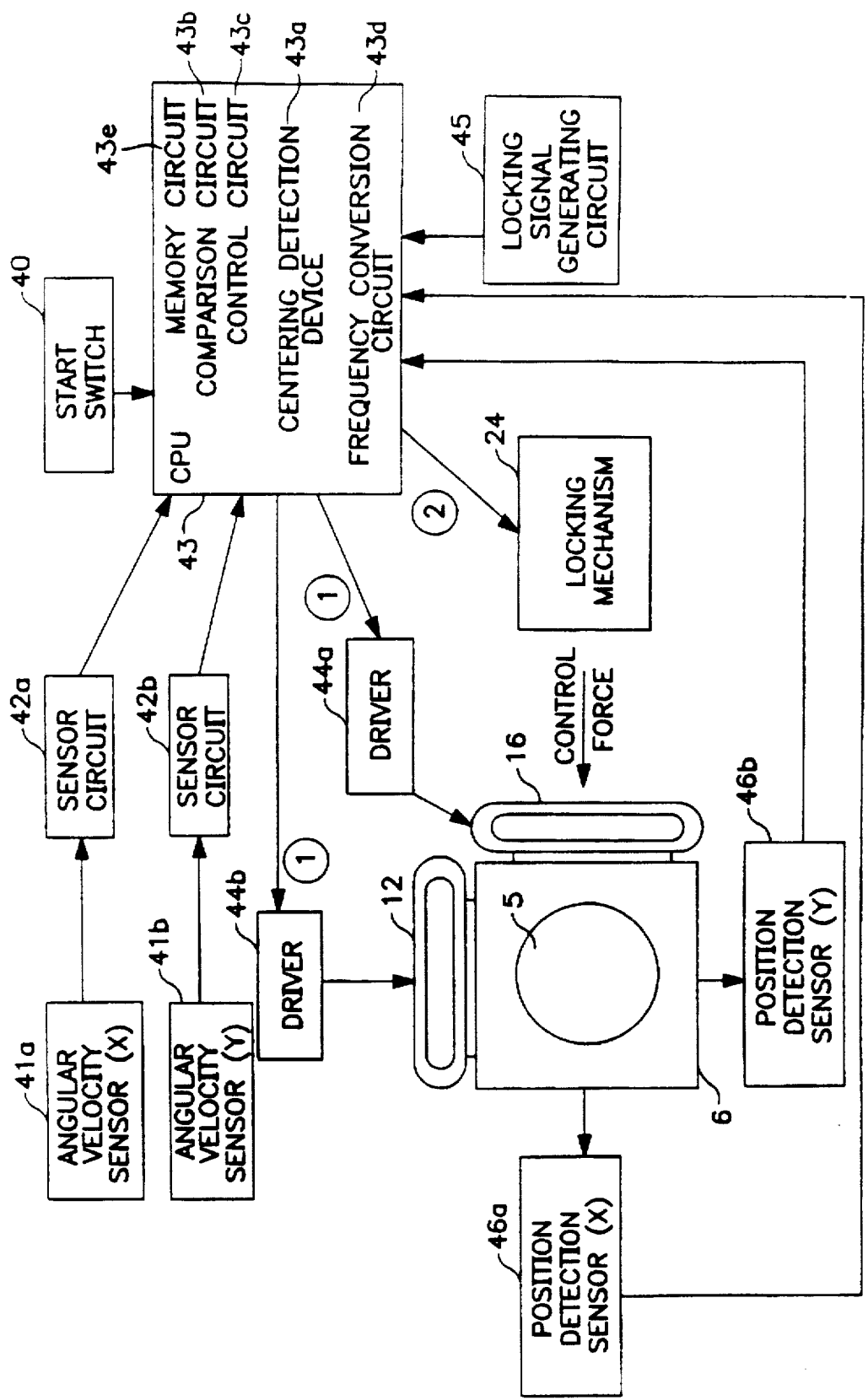
FIG. 4 is a block diagram showing an optical device according to the first embodiment.

FIG. 4 is a block diagram showing the optical device according to the first embodiment.

Start switch 40 is a switch that starts the camera. The signal from the start switch 40 is sent to a CPU 43. Angular velocity sensors 41a, 41b are sensors which detect blurring motion. Output of the sensors 41a, 41b, after passing through sensor circuits 42a, 42b, which amplify and filter the signals from sensors 41a and 41b, is input to the CPU 43 as camera vibration data.

Moreover, position detection sensors 46a, 46b are sensors which detect the position of the blurring motion compensation lens 5. As shown in FIG. 2, they are constituted by LEDs 20, 22, slits 6b, 6c, and PSDs 21, 23. The lens position signals detected by the PSDs 21, 23 are input to the CPU 43.

The CPU 43, apart from photographic control of AF or exposure and the like, is the central management or operational device which performs blurring motion compensation control. The CPU is equipped with a centering detection device 43a, a comparison circuit 43b, a control circuit 43c, a frequency conversion circuit 43d, and a memory circuit 43e.

The control circuit 43c moves the blurring motion compensation lens by driving the voice coils 12, 16 via the drivers 44a, 44b. Moreover, a locking signal generating circuit 45 generates a locking signal, which may be one which is input from the exterior, or an input determined in the system interior.

Centering detection device 43a is a device which determines whether to perform centering. The output from the centering detection device 43a is connected to the control circuit 43c. This centering detection device 43a starts by a locking signal from a locking signal generating device 45. In the case that it was decided that centering is necessary, according to the flow chart of FIG. 8 as described hereinbelow, after centering has been performed, the centering detection device 43a outputs a locking instruction signal. Moreover, in the case that it was decided that centering is not necessary, it does not perform the centering action, and outputs a locking instruction signal.

The control circuit 43c, accompanying the instruction signal of the centering detection circuit 43a, operates the locking mechanism 24.

FIGS. 5(A)-7 are diagrams illustrating the decision operation of the centering decision circuit of the optical device according to the first embodiment. For example, the centering detection device 43a, in the following cases, decides that centering is not performed.

(1) Case of outside permitted range

When the camera is in the course of an exposure, in response to position signals which have been detected by the PSDs 21, 23, as shown in FIG. 2, the centering detection device 43a decides not to perform centering in the case that the optical axis of the blurring motion compensation lens 5 is outside a constant permitted range 32 from the center of a drive range 31 in order for blurring motion compensation.

Figure 5A:
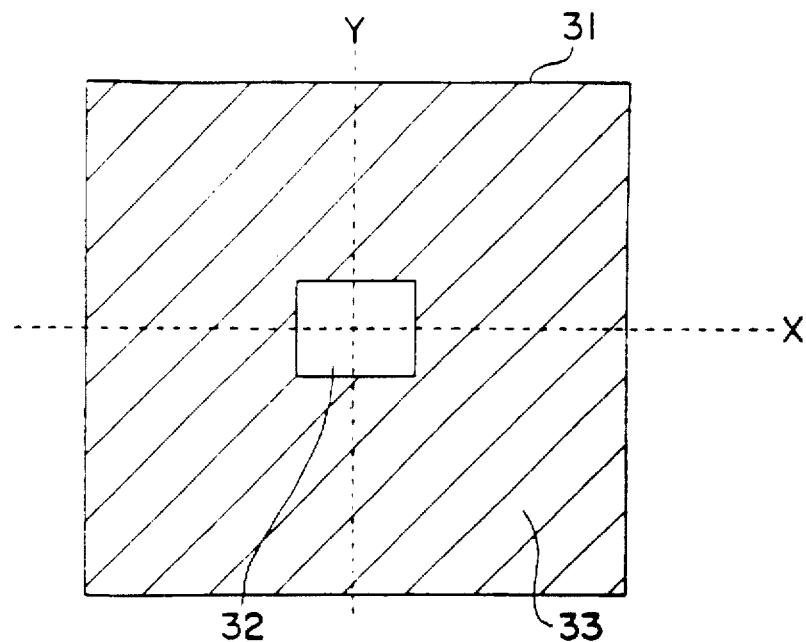
FIGS. 5(A) and 5(B) are diagrams illustrating the decision operation of a centering decision device of an optical device according to the first embodiment.

The arrangement of the permitted range 32, as shown in FIGS. 5(A) and (B), for example, is determined as follows. In the case that the tolerance value of the blurring motion compensation of the blurring motion compensation mechanism was 100 µm, according to this, X=±100 µm, Y=±100 µm as the permitted range in which centering is performed. Moreover, considering the diagonal lines, these can be made X=±100/√2 (µm), Y=±100/√2 (µm).

Figure 5B:
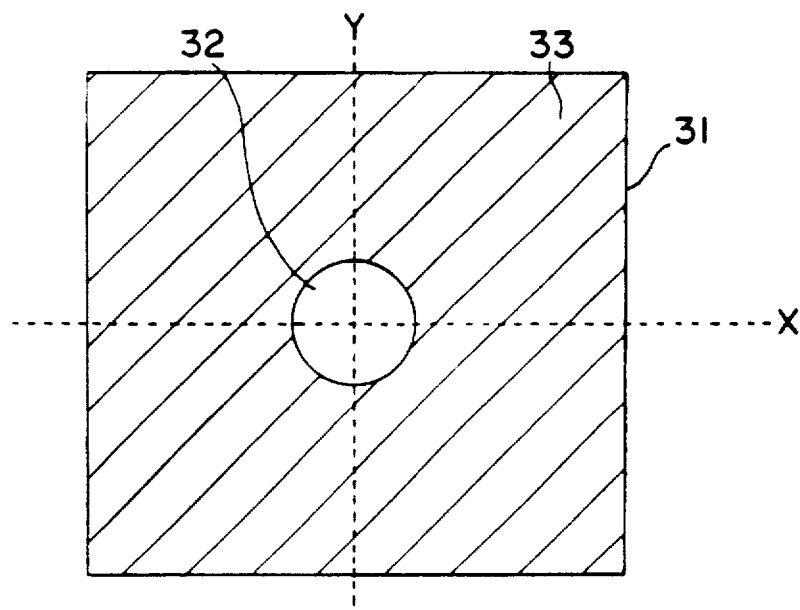

Furthermore, for example, as shown in FIG. 5(B), the permitted range 32 is a circle, which may have radius R=100 µm.

(2) Case that exposure time remains

When in the course of a camera exposure, in the case that the remaining exposure time is greater than a constant time, the centering detection device 43a decides not to perform centering.

Figure 6:
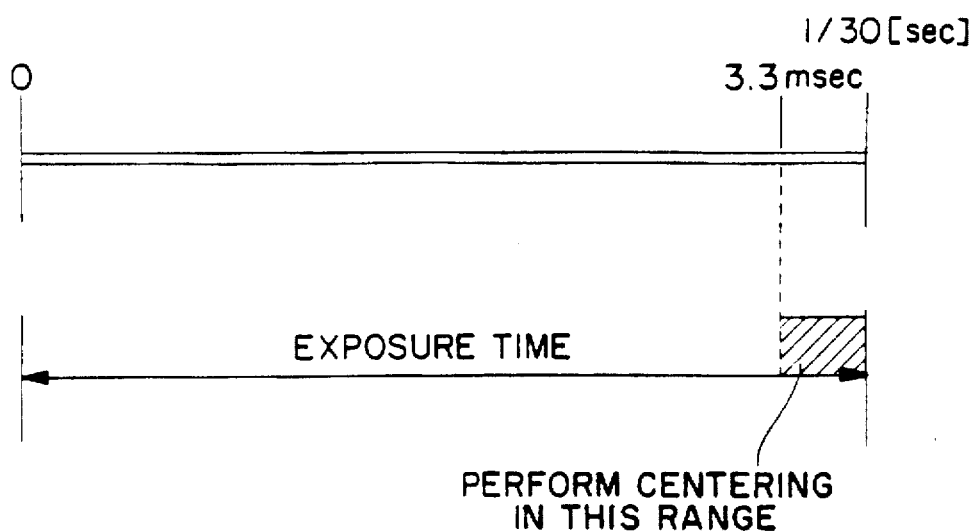
FIG. 6 is a diagram illustrating the decision operation of the centering decision device of an optical device according to the first embodiment.

For example, in the case that (a) the permitted range of blurring motion compensation of the blurring motion compensation mechanism is 100 µm, as shown in FIG. 5(A) and 5(B), (b) the drive speed while performing centering is 30 mm/sec, and (c) the shutter speed provisionally has been taken as 1/30 second as shown in FIG. 6, then if the remaining exposure time comes within 3.3×10$^{-3}$ sec, centering may be performed because the blurring motion during the time in which centering was performed is within 100 µm. However, if the blurring motion is above 100 µm, centering is not performed, and the locking mechanism 24 is caused to operate.

(3) Case equal or close to resonant frequency

In the case that the blurring motion detection signal or the lens position detection signal is equal to the resonant frequency, or close to the resonant frequency, of the blurring motion compensation mechanism, the centering detection device 43a decides not to perform centering.

In case #3, CPU 43 is constituted as follows.

The lens position signal detected by the PSDs 21, 23 is connected to the frequency conversion circuit 43d of the CPU 43. The frequency conversion circuit 43d is a circuit which converts the frequency, using FFT (fast Fourier transform) and the like methods. Its output is connected to a comparison circuit 43b.

The comparison circuit 43b is a circuit which compares the frequency of the blurring motion detection signal or the lens position detection signal from the frequency conversion circuit 43d, with the resonant frequency stored in the memory circuit 43. The result of this comparison is connected to the centering detection circuit 43a.

The resonant frequency f of the blurring motion compensation mechanism can be found by the following equation.

$$f=((k/m)^{1/2})/2\pi,$$

where m=the mass of the frame 6 and voice coils 12, 16 and the blurring motion compensation lens 5, k=the spring constant of the resilient support members (wires), and π=circle circumference ratio.

In the present embodiment, the resonant frequency set by the above method is provisionally 20 Hz.

(3-1) Case decided to be same as resonant frequency

Figure 7:
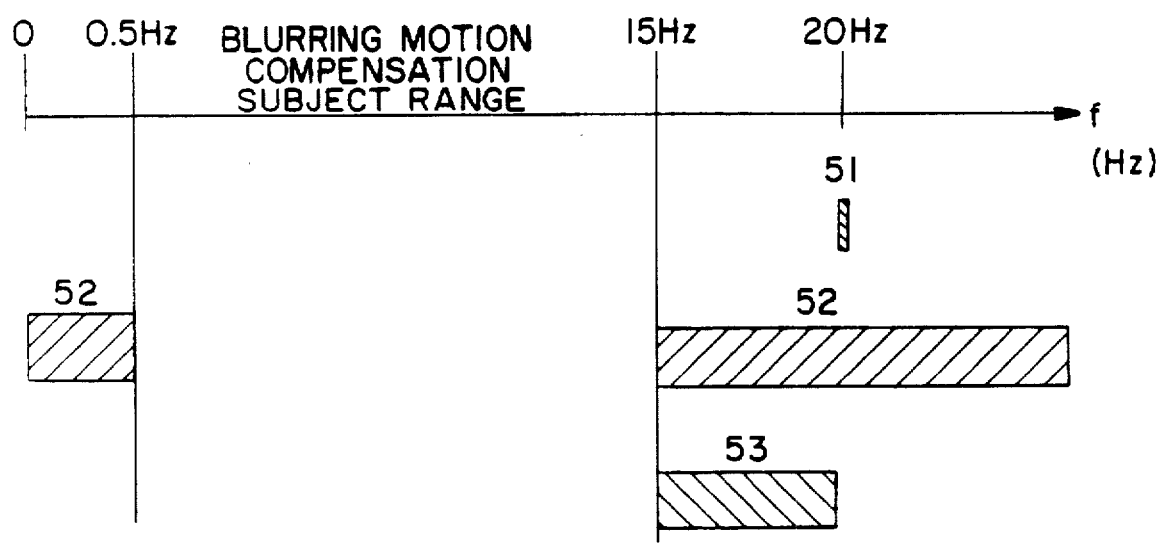
FIG. 7 is a diagram illustrating the decision operation of the centering detection device of an optical device according to the first embodiment.

In FIG. 7, blurring motion compensation occurs over a predetermined subject range.

In the case that the frequency of the blurring motion detection signal or of the position detection signal is determined to be the same as the resonant frequency of the blurring motion compensation mechanism (region 51 of FIG. 7), the centering detection circuit 43a outputs a signal to the effect that centering is not performed.

(3-2) Case decided to be close to the resonant frequency

In the case that the frequency of the blurring motion detection signal or of the position detection signal is determined to be close to the resonant frequency of the blurring motion compensation mechanism (in the region 53 of FIG. 7, case that is close to 20 Hz), the centering detection circuit 43a outputs a signal to the effect that centering is not performed.

(4) Case outside range of blurring motion compensation control

In the case that the frequency of the blurring motion detection signal or of the position detection signal is outside the range of blurring motion compensation control by the blurring motion compensation mechanism (region 52 of FIG. 7), the centering detection circuit 43a outputs a signal to the effect that centering is not performed.

Above, in the examples which conform to any one or more of the cases (1)–(4), the centering detection device 43a decides that centering is not performed, and it outputs an instruction signal to the control circuit 43c such that the locking mechanism 24 is locked.

Moreover, the centering detection circuit 43a by the operation of the memory 43b, can change or follow these conditions.

The operation of the first embodiment will next be described, based on FIGS. 8–10.

Figure 8:
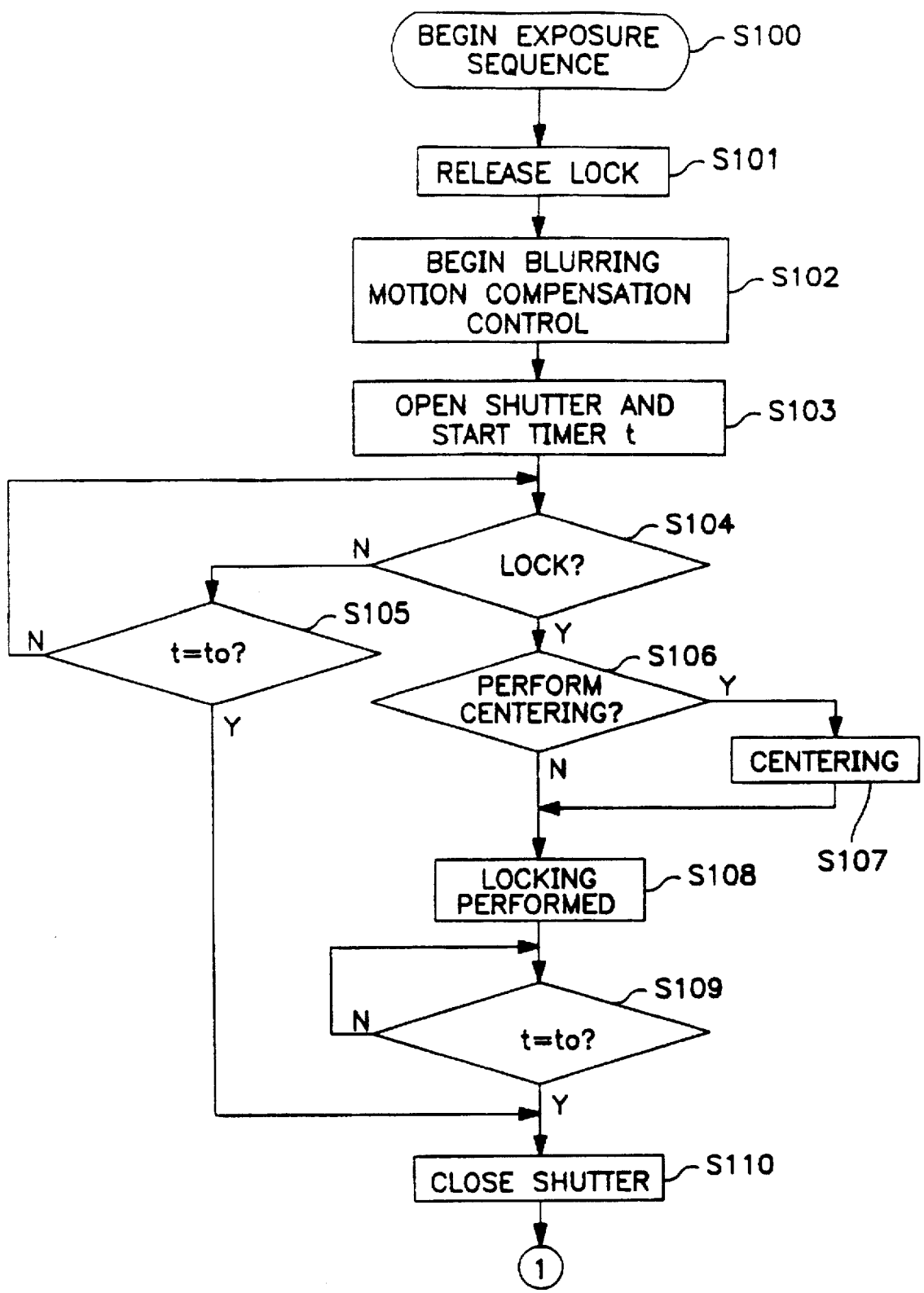
FIG. 8 is a flow chart showing the exposure sequence (part 1) of an optical device according to the first embodiment.
Figure 9:
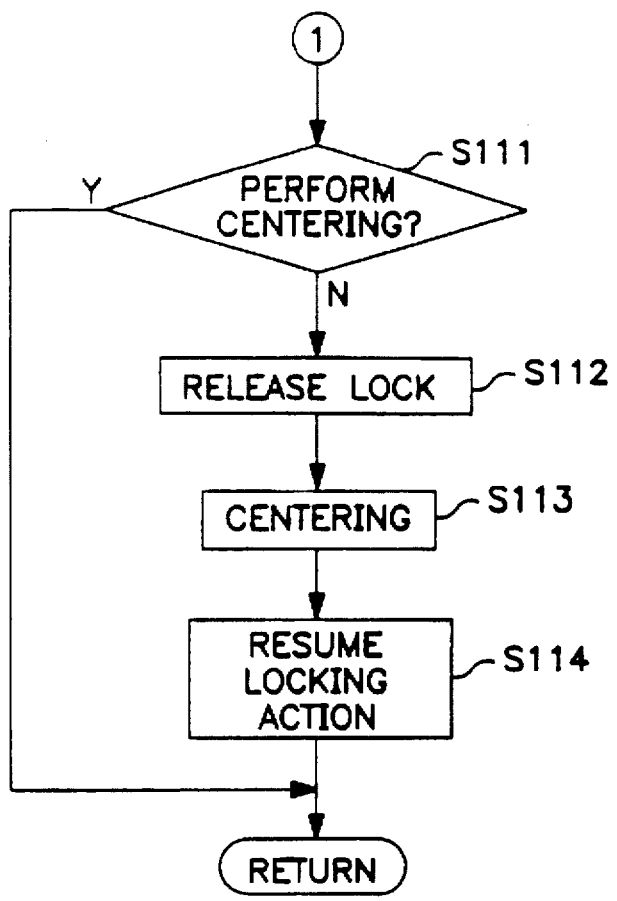
FIG. 9 is a flow chart showing the exposure sequence (part 2) of an optical device according to the first embodiment.

FIGS. 8 and 9 are flow charts which show the exposure sequence of an optical device according to the first embodiment.

The exposure sequence begins in step S100, the lock is released in step S101, and the blurring motion compensation control is commenced in step S102. The shutter is then opened, and a timer is started for t (the exposure time) in step S103.

Next, it is determined in step S104 whether to lock. In the case that it was decided not to lock, it is determined whether it is the shutter closing time (t=t$_0$) in step S105. In the case that t=t$_0$, the shutter closes in step S110. In the case before t=t$_0$, i.e. "No" in step S105, the determination of step S104 is repeated.

In step S104, in the case that it is decided to lock, according to the decision criteria (1)-(4), it is determined in step S106 whether centering is performed.

In the case that it was decided that centering is performed, centering is performed in step S107. In the case that it was decided not to perform centering, the process directly proceeds to step S108 where locking is performed by the locking mechanism 24.

Here, the decision in step S109 whether the shutter closing time ($t=t_0$) has arrived is made, and in the case that $t=t_0$, the shutter closes in step S110.

Next, in the previously mentioned conditions, in not performing centering, locking is performed, and centering detection device 43a performs control after this according to the later sequence.

As shown in FIG. 9, after the end of exposure, that is, closing of the shutter in step S110, it is decided in step S111 whether centering is performed. In the case of not performing centering, once locking is released in step S112, centering is then performed in step S113, and then the locking mechanism 24 is caused to operate and the locking action is resumed in step S114.

Figure 10:
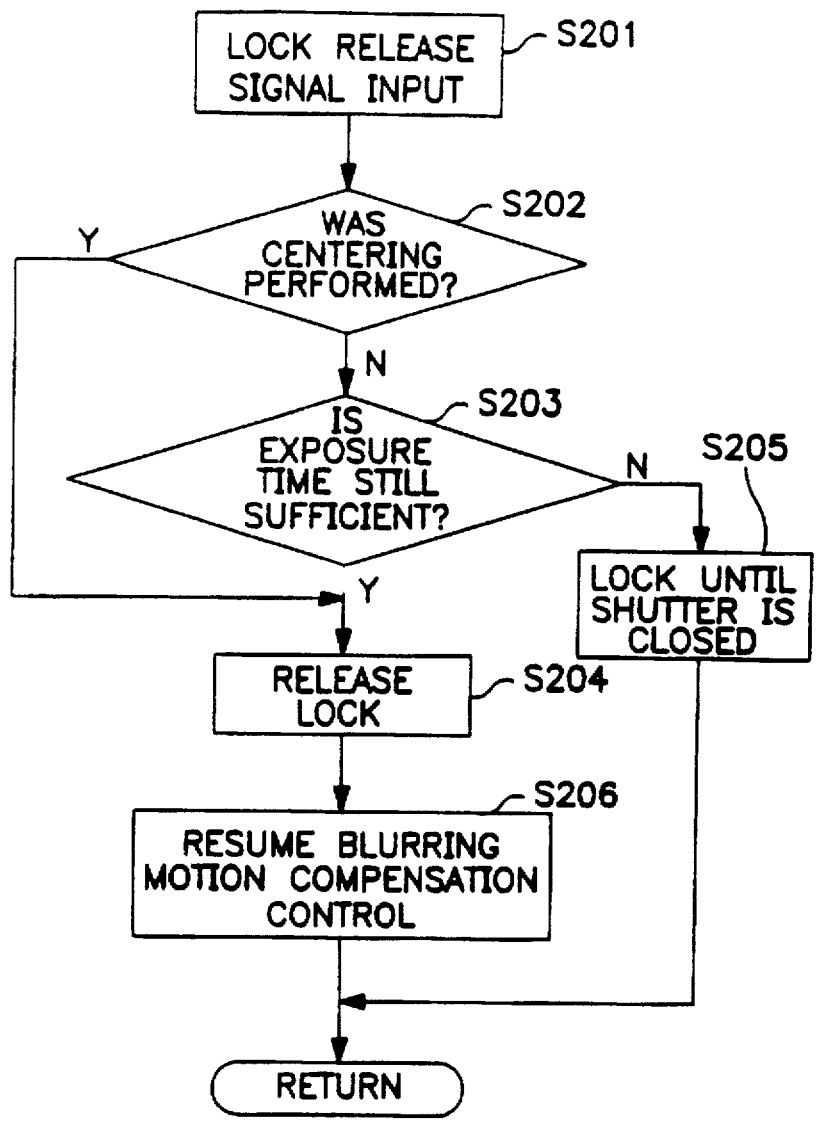
FIG. 10 is a flow chart showing the case in which a lock release signal was emitted during an exposure of an optical device according to the first embodiment.

FIG. 10 is a flow chart showing the case in which a lock release signal has been emitted during continuation of exposure.

In the case that a lock release signal has been input in step S201 during the continuation of exposure, it is then determined in step S202 whether centering was performed. In the case that centering was performed, the routine proceeds to step S204, and the lock is released.

In the case that centering is not performed, it is determined in step S203 whether the exposure time is still sufficient. In the case that it is not sufficient, locking continues until the shutter closes in step S205.

In the case that the exposure time is still sufficient, after the lock has been released in step S204, blurring motion compensation control is resumed in step S206 so that effects on the picture image are a minimum.

This lock release condition also may be supplemented or altered by the operation of the memory.

SECOND EMBODIMENT

Figure 11:
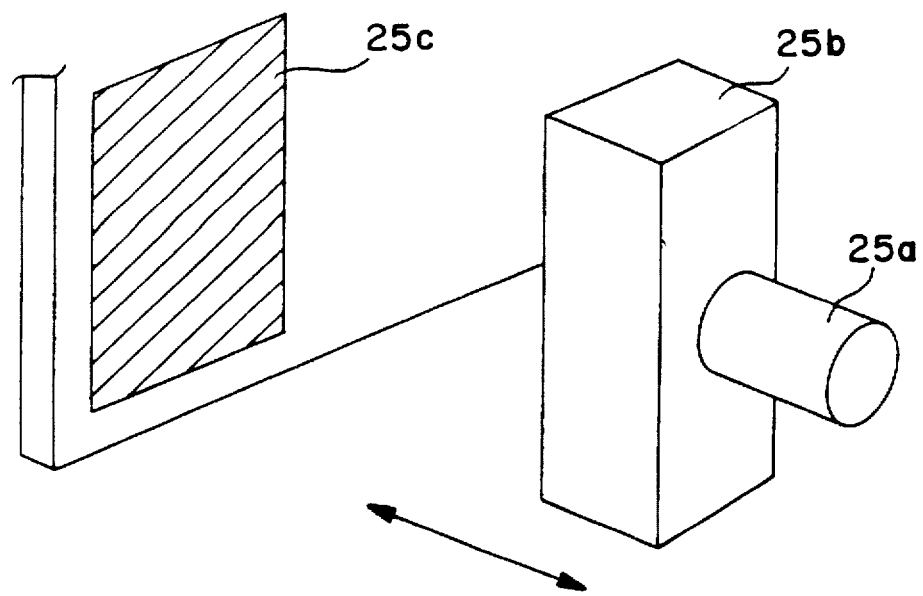
FIG. 11 is an oblique diagram showing a locking mechanism of an optical device according to a second embodiment of the present invention.
Figure 12:
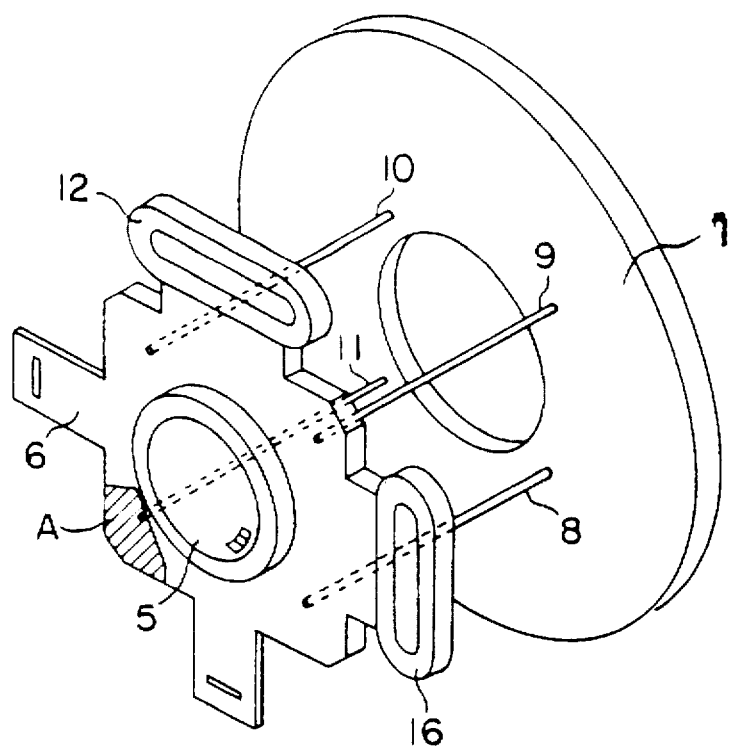
FIG. 12 is an oblique diagram showing the locking mechanism of a known optical device with a blurring motion compensation mechanism.
Figure 13:
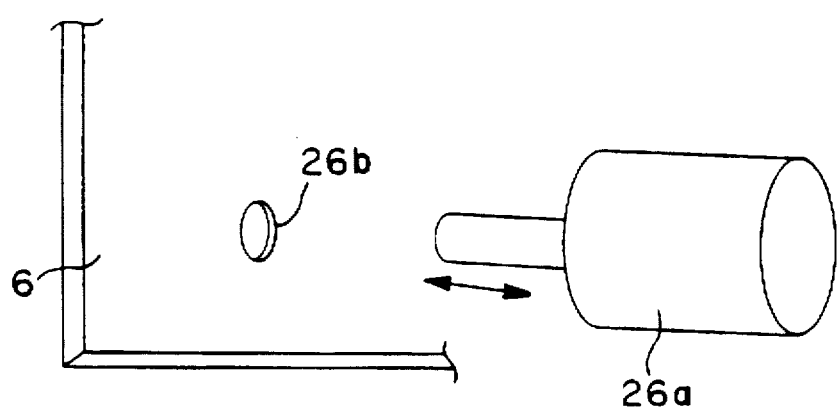
FIG. 13 is a diagram showing the locking mechanism of a known optical device with a blurring motion compensation mechanism.

FIG. 11 is an oblique diagram showing the locking mechanism of an optical device with a blurring motion compensation mechanism according to a second embodiment of the present invention.

The locking mechanism of the second embodiment includes a drive device 25a, a friction member 25b arranged at the end of the drive device 25a, and a friction receiving member 25c, disposed on the portion A of the lens frame 6 of FIG. 2 and made of rubber or the like, to set a high coefficient of friction μ with respect to the friction member 25b. According to a locking signal, by pushing the friction member 25b against the friction receiving member 25c, the blurring motion compensation lens 5 can be caused to stop in an optimal position.

It is possible that both the surfaces 25b and 25c generate friction. It is desirable to maintain sufficient surface area of the portion A of the lens frame 6 to cause stopping in a desired position.

MODIFIED EMBODIMENTS

The optical device according to the present invention is not limited to the embodiments described hereinabove; various modifications or alterations are possible, and these likewise fall within the scope of the invention.

The optical device according to further embodiments of the present invention, other than using the wire and the like resilient support members 8, 9, 10, 11, may move on rails, move by the use of magnetic force, and can also be used as the blurring motion compensation mechanism.

In addition to still cameras, the optical device according to the present invention can also be applied to video cameras or binoculars and the like.

The optical device according to the embodiments of the present invention described in detail hereinabove, allows the blurring motion compensation optical system to be locked in a desired position.

Accordingly, when not performing centering, it is possible to lock the blurring motion compensation optical system. Moreover, from a determination of whether or not centering is performed, the blurring motion compensation optical system can be locked, according to necessity. This prevents worsening of image blurring accompanying centering at the time of blurring motion compensation.

Although a few of the preferred embodiments have been shown and described, it would be appreciated by those skilled in the art that changes may be made in these embodiments without departing from the principles and spirit of the invention, the scope of which is defined in the claims and their equivalents. Further, one of ordinary skill in the art will recognize that while the preferred embodiments have been shown and described as being used within an optical camera, they may be adapted for use in any device in which it is desirable to suppress blurring of an image formed by an optical system, for example, in camcorders, motion picture cameras, telescopes, binoculars, range finding equipment, laser systems, fiber optic communication systems, various optical projection systems and CD mastering systems.

What is claimed is:

1. An optical device having an image blurring motion compensation mechanism, the optical device comprising:
   the blurring motion compensation mechanism having
   a blurring motion detector to detect blurring motion of a subject image;
   a blurring motion compensation optical system to compensate for the blurring motion detected by said detector by moving an optical axis of the optical system;
   a blurring motion compensation system drive device to drive the blurring motion compensation optical system;
   a blurring motion control device to control the blurring motion compensation optical system drive device, based on output of the blurring motion detector;
   a locking mechanism capable of locking the blurring motion compensation optical system in one of a plurality positions; and
   a locking control device to control the operation of the locking mechanism.

2. An optical device having a blurring motion compensation mechanism according to claim 1, further comprising:
   a centering detection device which decides whether the blurring motion compensation optical system performs a centering operation by moving to a predetermined initial position; and
   the locking control device causes the locking mechanism to operate, based on the decision result of the centering detection device.

3. An optical device with blurring motion compensation mechanism according to claim 2, wherein:
   the centering detection device, during an image exposure, in the case that the optical axis of the blurring motion compensation optical system is outside a predetermined range from the center of a drive range in order for blurring motion compensation, decides that centering is not to be performed.

4. An optical device with blurring motion compensation mechanism according to claim 2, wherein:

the centering detection device, during an image exposure, in the case that remaining exposure time is greater than a predetermined time, decides that centering is not to be performed.

5. An optical device with blurring motion compensation mechanism according to claim 2, wherein:

the centering detection device, in the case that a frequency of a detected blurring motion detection signal from the blurring motion detector is equal to or close to the resonant frequency of the blurring motion compensation optical system drive device, decides that centering is not to be performed.

6. An optical device with blurring motion compensation mechanism according to claim 2, wherein:

the centering detection device, in the case that a frequency of a detected blurring motion detection signal from the blurring motion detector is outside the subject range of blurring motion compensation control of the blurring motion compensation optical system, decides that centering is not to be performed.

7. An optical device with blurring motion compensation mechanism according to claim 2, further comprising:

an optical system position detector to detect the position of the blurring motion compensation optical system, wherein the centering detection device, in the case that a frequency of a detected optical system position detection signal from the optical system position detector is equal to or close to the resonant frequency of the blurring motion compensation optical system, decides that centering is not to be performed.

8. An optical device with blurring motion compensation mechanism according to claim 2, further comprising:

an optical system position detector to detect the position of the blurring motion compensation optical system, wherein the centering detection device, in the case that a frequency of a detected optical system position detection signal from the optical system position detector is outside a predetermined range of blurring motion compensation control by the blurring motion compensation optical system drive device, decides that centering is not to be performed.

9. An optical device with blurring motion compensation mechanism according to claim 2, wherein:

the locking control device, when it receives a lock release signal during an exposure, as long as centering has been performed, releases the locking of the locking mechanism.

10. An optical device with blurring motion compensation mechanism according to claim 2, wherein:

the locking control device, when it receives a lock release signal during an image exposure, in the case that the exposure time is sufficient, releases the locking of the locking mechanism.

11. An optical device with blurring motion compensation mechanism according to claim 1, wherein:

the locking mechanism includes at least one engagement unit and, opposite the engagement unit, a plurality of engagement receiving units to engage with the engagement unit in a region which corresponds to a movement amount of the blurring motion compensation optical system, and the engagement unit and the engagement receiving units are disposed on one side of the blurring motion compensation optical system.

12. An optical device with blurring motion compensation mechanism according to claim 11, wherein:

the plurality of engagement receiving units are regular polygonal pyramids of concave or convex form, the at least one engagement unit includes a polygonal spindle, and the plurality of engagement receiving units are located so as to completely overlap adjacent to each edge of a bottom surface of the polygonal spindle.

13. An optical device with blurring motion compensation mechanism according to claim 1, wherein:

the locking mechanism includes a friction member and, facing this friction member, a friction receiving member having a surface area corresponding to a movement amount of the blurring motion compensation optical system, and the friction member and the friction receiving member are disposed at one side of said blurring motion compensation optical system.

14. An optical device with an image blurring motion compensation mechanism, comprising:

a locking mechanism to lock the blurring motion compensation mechanism in place, said locking mechanism including a first member and a second member, and said locking mechanism being effective over an area equal to a surface area of said second member.

15. An optical device according to claim 14, further comprising a blurring motion compensation optical system, and wherein said second member is part of said optical system.

16. An optical device according to claim 15, wherein said first member includes a projecting part having a geometric shape formed at an end thereof.

17. An optical device according to claim 16, wherein said geometric shape is a polygonal structure.

18. An optical device according to claim 17, wherein said polygonal structure is a pyramid.

19. An optical device according to claim 14, wherein said first member includes a friction member and said second member includes a friction receiving member.

20. A method of locking an image blurring motion compensation optical system in place, comprising:

centering, if desired, said optical system; and locking the optical system in place by positioning a first member in one of a plurality of positions on a second member, said first member contacting said second member.

* * * * *